United States Patent
Beer

(10) Patent No.: US 6,214,394 B1
(45) Date of Patent: Apr. 10, 2001

(54) ICE CREAM WITH FAT-CONTAINING COATING

(75) Inventor: Richard Beer, Nürnberg (DE)

(73) Assignee: Scholler Lebensmittel GmbH & Co. KG, Nuremberg (DE)

(*) Notice: Subject to any disclaimer, the term of this patent is extended or adjusted under 35 U.S.C. 154(b) by 0 days.

(21) Appl. No.: 09/380,433

(22) PCT Filed: Jul. 23, 1997

(86) PCT No.: PCT/EP97/03995

§ 371 Date: Sep. 1, 1999

§ 102(e) Date: Sep. 1, 1999

(87) PCT Pub. No.: WO98/43491

PCT Pub. Date: Oct. 8, 1998

(30) Foreign Application Priority Data

Mar. 27, 1997 (DE) .............................................. 197 13 191

(51) Int. Cl.⁷ ...................................................... A23G 9/00
(52) U.S. Cl. .......................... 426/302; 426/89; 426/100; 426/101; 426/305; 426/306; 426/307
(58) Field of Search ................................ 426/89, 91, 93, 426/100, 101, 302, 303, 304, 305, 306, 307, 309, 293

(56) References Cited

U.S. PATENT DOCUMENTS

| | | | |
|---|---|---|---|
| 1,470,524 | * 10/1923 | Burt | 426/101 X |
| 1,618,324 | * 2/1927 | Burt | 426/101 X |
| 1,718,997 | * 7/1929 | Burt | 426/101 X |
| 1,900,355 | * 3/1933 | Maurer | 426/306 |
| 1,923,587 | * 8/1933 | Robb | 426/306 X |
| 2,048,364 | * 7/1936 | Willems | 426/101 |
| 2,176,408 | * 10/1939 | Peterson | 426/101 X |
| 2,191,352 | * 2/1940 | Oprean | 426/101 X |
| 2,217,700 | * 10/1940 | Musher | 426/101 X |
| 2,288,970 | * 7/1942 | Weisbender | 426/101 X |
| 4,971,816 | * 11/1990 | Clark et al. | 426/101 |
| 5,017,390 | * 5/1991 | Sawant | 426/101 X |
| 5,256,426 | * 10/1993 | Tomioka et al. | 426/101 X |
| 5,660,866 | * 8/1997 | Tomioka et al. | 426/101 X |
| 5,843,512 | * 12/1998 | Daouse et al. | 426/101 X |
| 5,958,493 | * 9/1999 | Grigoli | 426/101 X |

FOREIGN PATENT DOCUMENTS

| | | |
|---|---|---|
| 848 736 | 7/1952 | (DE) . |
| 0 322 952 | 7/1989 | (EP) . |
| 0 500 940 | 9/1992 | (EP) . |
| 0 560 053 | 9/1993 | (EP) . |
| 61-56045 | 3/1986 | (JP) . |
| 61 056045 | 7/1986 | (JP) . |
| 7-163301 | 10/1995 | (JP) . |
| 8-126476 | 9/1996 | (JP) . |
| WO 95 20883 | 8/1995 | (WO) . |

* cited by examiner

*Primary Examiner*—Milton Cano
(74) *Attorney, Agent, or Firm*—Scully, Scott, Murphy & Presser

(57) ABSTRACT

The invention relates to a method for the production of two-component ice cream, in which a core of ice cream, the surface of which is cooled to at least about −15° C., is dipped into a fat-containing coating solution, in order to form a coating layer, and to the two-component ice cream which can be obtained with the method. Thereby, the fat content of the coating solution should be at least about 10%.

18 Claims, No Drawings

ICE CREAM WITH FAT-CONTAINING COATING

This application is a 371 of PCT/EP97/03995, filed Jul. 23, 1997.

The present invention relates to a method for the production of two-component ice cream products, in which a frozen core of ice cream is surrounded by a fat-containing coating. The invention relates further to two-component ice cream products which can be obtained with a method according to the invention.

BACKGROUND OF THE INVENTION

Two or more component ice cream products, in which a core of ice cream is surrounded by a further layer of ice cream, differing from the composition of the core, are generally known in the state of the art and have been on the market for many years. For the production of two-component ice cream, for example having an inner dairy ice core and an outer water ice layer, a water ice solution is filled into a mold cooled to low temperatures, whereby a thin, solid water ice layer forms on the inner surface of the mold. After pumping off of the remainder of the water ice solution, still in the liquid state, there can be introduced into the mold—now coated on the inside with a water ice layer—another material, for example dairy ice, whereupon the mold is again cooled. For removal of the final product, the mold must then be slightly warmed, so that the two-component ice cream can be drawn out of the mold without damage. This method yields, however, products in which the outer frozen water ice layer has very large ice crystals and is hard and brittle, and when consumed breaks into small parts.

Since this method is also relatively complex and complicated, for the production of two-component ice cream products there is increasingly used the so-called dipping method, with which a core of ice cream, pre-cooled to a certain temperature, is dipped a water ice solution, whereby due to the low temperature of the core a water ice layer forms on its surface. The water ice solution can be aerated in advance, which favours the formation of small water ice crystals, by which means a sandy taste in the final product can be avoided.

EP 0 710 074 teaches for example the production of a combined ice lolly that consists of a core of dairy ice and a water ice coating. The ice cream is produced by dipping the core, cooled to below $-15°$ C., in a water ice solution, whereby during the dipping procedure a water ice layer forms on the core. The core covered with the water ice is than again cooled, for example by dipping into a cryogenic liquid, in order to ensure an improved adherence of the water ice layer on the dairy ice core and keep the crystals in the coating solution small.

In Japanese published patent application 61 (86)-56045 there is disclosed the production of a multi-layer ice cream having great aeration in the coating, in which a core for example of dairy ice or sorbet is dipped into an aqueous sol. The sol is obtained by means of dissolving 30–50% sugar solids, 3–6% gelatine and 1% albumin and, for stabilizing the air bubbles (aeration) to be provided in the coating, is provided with 0.3% sugar esters.

U.S. Pat. No. 2,985,263 further describes a method for coating a frozen ice product with a aqueous coating solution which for ensuring the adhesion of the aqueous coating solution to the core contains an alkali metal alginate.

The object of the present invention is thus to make available an ice cream with fat-containing coating and a method for the production thereof, in which the coating is not hard and which does not shatter upon consumption and which has a consistency perceived as soft and creamy.

The object is achieved by means of a method in which the surface of a frozen core of ice cream is brought to a temperature below at least about $-15°$ C., the surface of the core is dipped into a fat-containing ice solution for a sufficient length of time, in order for a quantity of the solution to form as layer on the core, the coating solution having a fat content of at least about 10% and the obtained layer having an aeration between 0 and 30%, referred to the volume of the coating solution, and then the whole is again cooled to a surface temperature of below at least about $-15°$ C., in order to harden the fat-containing layer on the frozen ice core of ice cream.

In a second aspect, the object is achieved by means of a method in which surface temperature of a frozen core of ice cream is brought to a temperature below at least about $-40°$ C., the surface of the core is dipped into a fat-containing ice solution for a sufficient period of time, in order for a quantity of the solution to form as a layer on the core, whereby the coating solution has a fat content of at least about 10% and the obtained layer has an aeration of between 0 to 30%, referred to the volume of the coating solution, whereby the coating layer of the product is so obtained has at least storage temperature or lower.

DETAILED DESCRIPTION OF THE INVENTION

The production of the ice core is effected by means of methods known in the state of art, such as for example extrusion or production in molds. The core may be of conventional ice cream and may contain any proteins commonly used in the production thereof, such as milk proteins and proteins of vegetable origin. Further, the core may, or may not, be aerated.

Before the dipping procedure, the surface of the core is brought to a temperature of below about $-15°$ C., a temperature in the range from about $-15°$ C. to $-60°$ C. being preferred, preferably $-30°$ C. to $-60°$ C. The desired core temperature can be attained by means of dipping for different lengths of time in a cryogenic liquid, for example nitrogen or carbon dioxide, whereby for example for liquid nitrogen dipping times of 7 to 35 seconds, preferably 12 to 18 seconds, have proved to be suitable.

The cooled core is then dipped in the coating solution, which has a fat content of least about 10%, preferably 10 to 40% and more preferably has a fat content in the range from 15% to 25%. A fat content from 15% to 18% has proved to be very suitable for the purposes for the invention.

As fat components of the coating solution there can be employed any known fat usable in ice cream production, such as animal fats, for example milk fat, or vegetable fats, such as for example coconut fat, cocoa fat, palm oil, soya oil, palm nut oil or rape oil, or a combination of animal and vegetable fats.

The milk, preferably to be employed for the fat components, can be used in any known form with different fat contents, whereby in particular liquid milk, cream, concentrated milk, milk powder, thickened skimmed milk powder, sour cream, yoghurt, curd cheese, buttermilk or kefir have proved to be suitable.

The proteins in the coating solution may likewise be of animal or also vegetable origin, whereby with regard to the source of fat likewise in particular milk suggests itself as a source of protein.

The coating solution can be aerated with air in accordance with known technical methods, whereby an aeration in the coating solution up to 30% is possible, preferably up to 20%. More preferred is an aeration in the range from 0 to 10%, in each case referred to the volume of the coating solution, whereby the aeration can be completely omitted, without negatively affecting the organoleptical characteristics of the final product.

It has now surprisingly been found that by means of the method in accordance with the invention, even with the indicated low quantities of aeration in the fat-containing coating, an even, smooth and creamy coating can be obtained.

During the dipping of the ice core therein, the temperature of the coating solution typically lies in the range from about 0° to about 20° C., whereby with regard to its storage stability a temperature range from 0° to 10° C. is preferred. The temperature of the coating solution is selected, during the method, in consideration of the temperature of the ice core to be dipped, so that during the dipping procedure there is effected a rapid adherence of the coating solution to the dipped ice core. Thereby, a temperature range from 2° to 4° C. has proved to be very suitable.

If, in accordance with the second aspect according to the invention, the temperature of the surface of the ice cream core is brought to below at least about −40° C., then upon dipping of the frozen ice core into the coating solution there is brought about, due to the temperature shock owing to the temperature difference between ice core and coating solution, a rapid adherence of the coating solution to the core, whereby in the coating layer only extremely small ice crystals form. With this aspect, the temperature of the coating solution is thus so selected that a sufficiently great temperature difference between the surface temperature and the temperature of the coating solution is made available, the skilled person appropriately selecting the temperature of the ice core and that of the coating solution on the basis of their general knowledge of the art. Preferred temperatures for the surface of the ice core lay below about −60° C. The temperature of the coating solution can also with this aspect to the invention lie in the about indicated range, whereby however due to the storage stability of fat-containing solutions and the desired great temperature shock, a range from 2 to 4° C. has proved to be very expedient.

The dipping time of the ice cream core in the coating solution is determined primarily by the temperature of the ice core and the temperature and fat-content of the coating solution. It is, however, typically 0.5 to 20 seconds and is appropriately chosen by the skilled person on the basis of their general knowledge of the art that the effects aimed at by the invention are obtained and a layer of the coating solution can be formed. The dipping processes can be repeated as desired until the desired layer thickness is attained. Thereby, also different coating solutions can be employed, whereby ice cream products having different coatings in one product to can be obtained.

Furthermore, there can be added to the coating solution further components known in the state of the art, such as sugar and sugar forms in accordance with the regulations governing sugar forms, stabilizers, such as carob flour, guar, alginate from 0.1 to 0.3% and emulsifiers for example mono and diglycerides. For flavouring, there may be added as desired known flavouring materials, but also pieced ingredients, such as fruit pieces, nuts, chocolate gratings, vanilla pods, coffee and cereals.

After removal from the coating solution, in accordance with the first embodiment of the invention, the coated core, now with a layer of the coating solution is again cooled to a temperature which falls in the range described for initial cooling of the core surface. Thereby there is ensured a stronger adherence of the coating layer to the ice core and a hardening is effected. The crystal size in the coating layer is kept small by these means.

With the second embodiment of the present invention, this repeated cooling step is not necessary. Thereby, however, it is important that the temperature of the coating layer, after removal from the coating solution, lies at approximately storage temperature, i.e. between about −18 to −28° C. As a result of the great temperature difference between the ice core and the coating solution the cold capacity of the ice core is so high that a rapid formation and immediate adherence of small crystals to the ice core is brought about. Since the coating layer, after removal from the coating solution, in accordance with the invention should have at most storage temperature, a further crystal growth in the coating layer is avoided.

In accordance with the invention, the method steps according to both the first embodiment and also according to the second embodiment, can be repeated a plurality of times with different temperature parameters in order to form a plurality of coating layers over one another or to increase the desired layer thickness. It is also possible, by means of several repeats of the method steps, to form layers of different coating materials over one another. Finally, it is possible to so combine the method steps according to the first and second embodiments that for example initially one or more coating layers in accordance with the method of the second embodiment are formed and then the final, uppermost coating layer is formed with the method of the first embodiment with the same coating solution as for the preceding layers or with different coating solutions.

The following examples explain the invention, without restricting the invention. In the examples, exemplary compositions are indicated which were used as coating solutions.

EXAMPLE 1

A core of ice cream is extruded in known manner and a stick introduced in the core. The ice core is delivered into a hardening tunnel and brought to a temperature of −22° C. Then, the thus pre-cooled ice cream product is dipped for 15 seconds in liquid nitrogen, whereby a surface temperature of below −40° C. is obtained. The ice cream is than dipped for 7 seconds in a coating solution having the following composition.

| Row materials | Weight % |
| --- | --- |
| Glucose syrup | 5.00 |
| Water | 24.50 |
| Cream 36% | 50.00 |
| Skimmed milk concentrate | 10.00 |
| Sugar | 10.00 |
| Emulsifier | 0.30 |
| Carob flour | 0.10 |
| Flavouring: vanilla | 0.10 |
| TOTAL: | 100.00 |

The ice cream product was then removed from the coating solution and again dipped in liquid nitrogen for 14 seconds. The product was than packed and stored in conventional manner.

The thus produced two-component ice cream product had a smooth and creamy surface. As a result of the creamy consistency of the coating layer, surprisingly, the taste of the ice cream core came to better advantage.

EXAMPLE 2

The method of Example 1 was repeated, with the proviso that the dipping time in the liquid nitrogen was 18 seconds. The dipping time in the coating solution was 7 seconds. The following solution was used as coating solution:

Vegetable fat-chocolate

| Row materials | Weight % |
| --- | --- |
| Glucose syrup | 4.00 |
| Water | 39.50 |
| Coconut fat | 15.00 |
| Skimmed milk concentrate | 22.00 |
| Sugar | 12.00 |
| Dextrose | 3.00 |
| Stabilizer carob flour | 0.20 |
| Emulsifier | 0.30 |
| Cacao 10/12 | 2.00 |
| Cacao 20/22 | 2.00 |
| TOTAL: | 100.00 |

The two-component ice cream product thus produced likewise had a smooth and creamy surface. It was also manifest here that due to the creamy consistency of the coating layer the flavour of the ice cream core came to better advantage.

EXAMPLE 3

The method of Example 1 was repeated, the conditions remaining as explained in this example. The following solution was used as coating solution:

Yoghurt - ice cream

| Row materials | Weight % |
| --- | --- |
| Glucose syrup | 4.00 |
| Water | 19.40 |
| Butter fat | 15.00 |
| Skimmed milk concentrate | 11.00 |
| Sugar | 12.00 |
| Dextrose | 3.00 |
| Stabilizer carob flour | 0.10 |
| Emulsifier | 0.30 |
| Yoghurt | 35.00 |
| Flavouring: Yoghurt | 0.20 |
| TOTAL: | 100.00 |

The two-component ice cream product produced with this coating solution had a smooth and creamy surface. Here also it was determined by tasting that due to the creamy consistency of the coating layer the flavour of the ice cream core came to better advantage.

EXAMPLE 4

A two-component ice cream was produced on the basis of the second embodiment in accordance with the invention. Thereby, the ice cream obtained as in Example 1 was dipped for 20 seconds each in a coating solution in accordance with Examples 1 to 3 (dipping time 5 seconds), the product so obtained then being transferred immediately into a zone having storage temperature.

The thus-obtained two-component ice cream products all had smooth and creamy surfaces and the flavour of the ice cream core came to better advantage.

What is claimed is:

1. Method for the production of a two-component ice cream, in which the surface of a frozen core of ice cream is brought to a temperature of below at least about −15° C., the surface of the core is dipped into a fat-containing coating solution for a period of time sufficient to form a quantity of the solution as an even layer on the core, the coating solution having a fat content of at least about 10% and the obtained layer having an aeration between 0 and 30% referred to the volume of the coating solution, whereafter the whole is again cooled to a surface temperature of below at least about −15° C. in order to harden the fat-containing layer on the frozen ice core of ice cream.

2. Method according to claim 1, in which the aeration is 0 to 10% of the volume of the coating solution.

3. Method according to claim 2, in which no aeration is present in the coating.

4. Method according to claim 1, in which the fat content of the coating solution is 15 to 18%.

5. Method according to claim 1, wherein the fat is milk fat or vegetable fat or a mixture thereof.

6. Method according to claim 5, in which the vegetable fat is coconut fat or cocoa fat or a mixture thereof.

7. Method according to claim 1, in which the core is dipped in a cryogenic liquid, for cooling.

8. Method according to claim 7, in which the cryogenic liquid is nitrogen or carbon dioxide.

9. Method according to claim 8, in which the ice core is dipped in liquid nitrogen for a time period of 7 to 25 seconds.

10. Method for the production of a two-component ice cream, in which the surface of a frozen core of ice cream is brought to a temperature of below at least about −40° C., the surface of the core is dipped into a fat-containing coating solution for a period of time sufficient to form a quantity of solution as an even layer on the core, the coating solution having a fat content of at least about 10% and the obtained layer having an aeration between 0 and 30% referred to the volume of the coating solution, and the formation of the layer is so effected that the coating layer of the thus obtained ice cream product after the dipping has at least storage temperature or lower.

11. Method according to claim 10, in which the aeration is 0 to 10% of the volume of the coating solution.

12. Method according to claim 11, in which no aeration is present in the coating.

13. Method according to claim 10, in which the coating solution has a temperature between 0 and 10° C. upon dipping of the core.

14. Method according to claim 10, wherein the fat is milk fat or vegetable fat or a mixture thereof.

15. Method according to claim 14, in which the vegetable fat is coconut fat or cocoa fat or a mixture thereof.

16. Method according to claim 10, in which the core is dipped in a cryogenic liquid, for cooling.

17. Method according to claim 16, in which the cryogenic liquid is nitrogen or carbon dioxide.

18. Method according to claim 17, in which the ice core is dipped in liquid nitrogen for a time period of 7 to 25 seconds.

* * * * *